United States Patent [19]

Hoffman et al.

[11] 4,146,131
[45] Mar. 27, 1979

[54] FOOD PROCESSOR TOOL HOLDER

[75] Inventors: Paul R. Hoffman, Toronto; Hans K. Wallenwein, Thornhill, both of Canada

[73] Assignee: Plasti-Fab Co. Ltd., Markham, Canada

[21] Appl. No.: 878,179

[22] Filed: Feb. 15, 1978

[30] Foreign Application Priority Data

Jun. 18, 1977 [GB] United Kingdom ............... 25575/77

[51] Int. Cl.² ...................... B65D 25/10; B65D 85/02
[52] U.S. Cl. .................................... 206/373; 206/806
[58] Field of Search ............... 206/373, 372, 349, 374, 206/375, 348, 303, 309, 490, 806; 83/544, 547

[56] References Cited

U.S. PATENT DOCUMENTS

| | | | |
|---|---|---|---|
| 1,914,276 | 6/1933 | Moore | 206/373 |
| 1,960,558 | 5/1934 | Stein | 206/490 |
| 2,183,074 | 12/1939 | Hopkins | 206/372 |
| 2,245,892 | 6/1941 | Anschicks et al. | 206/372 |
| 2,555,594 | 6/1951 | Markovitz | 206/309 |
| 2,725,143 | 11/1955 | Linebaugh et al. | 206/309 |
| 3,156,349 | 11/1964 | Brown | 206/349 |
| 3,259,231 | 7/1966 | Romanowski et al. | 206/349 |
| 3,870,148 | 3/1975 | Hite | 206/309 |

*Primary Examiner*—William T. Dixson, Jr.
*Attorney, Agent, or Firm*—Ridout & Maybee

[57] ABSTRACT

A holder is provided for the tools of a food processing machine, the tools being of the kind which have stems that can be driven by a food processor motor, with cutting or other active elements radial to the stems. The holder includes a plurality of panels with spaces between the panels to accommodate the active elements of the tools, and with slots which extend inwardly from edges of the panels and along which the stems can slide to positions where the active elements do not protrude beyond the edges of the panels.

12 Claims, 8 Drawing Figures

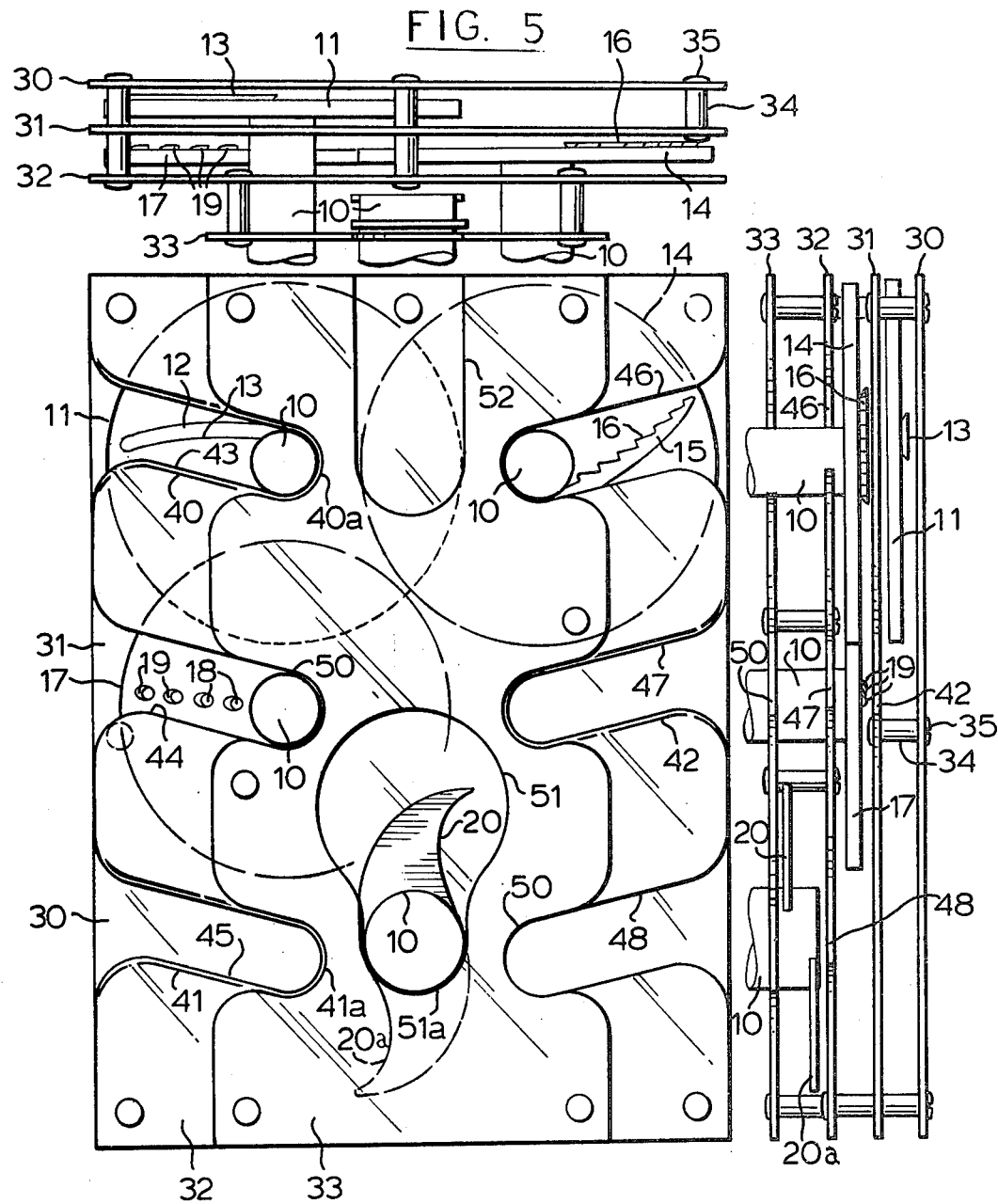

FOOD PROCESSOR TOOL HOLDER

BACKGROUND OF THE INVENTION

1. Field of the Invention

This invention relates to a holder for the tools of a food processor or the like.

2. Description of the Prior Art

It is common to provide several tools which can be mounted selectively on the shaft of a motor to accomplish a variety of operations. For example, a food processing machine may have a variety of cutting, grinding, grating, stirring and juice extracting tools that can be attached to the shaft of an electric motor to perform different tasks.

The tools often have sharp edges and odd shapes which make them awkward to store and handle safely.

SUMMARY OF THE INVENTION

The present invention consists of a holder for tools of the kind having active elements radial to hubs or shafts thereof (such hubs or shafts being hereinafter called stems), the holder comprising a plurality of flat panels, means spacing the panels apart from one another thereby providing spaces between the panels to accommodate the active elements of the tools, and slots which extend inwardly from edges of the panels and along which the stems of the tools can slide, with the stems protruding from the slots, to insert the active elements between panels and to remove the active elements from between the panels, the tools when inserted being supported between the panels with the active elements not protruding beyond the edges of the panels so that the panels provide protection against injury. The panels should be sufficiently close together that, with the panels vertical, they sustain the active elements in substantially vertical planes between them, with the stems protruding from the slots so that the stems can be readily grasped. The slots should extend downwardly from the edges of the panels so that the tools must be lifted to remove them from the holder. One panel serves as a rear panel, one as a front panel, and another or others as intermediate panels. The provision of at least three panels provides at least two spaces between panels, making it possible to store tools with active elements in one space overlapping active elements in another space, but the slots can be so located that active elements in the same space are held out of contact with one another. Slots in an intermediate panel are aligned with slots in the panel or panels in front of it so that the latter panels do not interfere with the passage of tool stems along the slots of the former panel, and the ends of the slots can be shaped to match the stems so that the latter nest in the slots. The rear panel can serve as a support panel for the holder, and at least the other panels are preferably transparent or translucent for easy visibility of the tools in the holder. The panels can be spaced apart by cylindrical posts, the panels being fixed to the posts by bolts which pass through the panels and are threaded into the posts, the posts being located at points where they do not interfere with insertion and removal of the tools. The front panel may be provided with an aperture which does not extend to an edge of the panel, the aperture being large enough for a noncircular active element to be inserted therethrough, thereby to be located between panels with its stem protruding from the aperture.

A holder made in accordance with the invention can be inexpensive, and can compactly and safely store the tools, and a desired tool can be readily located and removed for attachment to the shaft of a food processor or the like.

BRIEF DESCRIPTION OF THE DRAWINGS

Two preferred embodiments of the invention are illustrated by way of example in the accompanying drawings in which:

FIG. 3 is a front view, showing, rather diagrammatically, four tools located in the holder;

FIG. 4 is a side view, with illustrations of parts of the same four tools;

FIG. 5 is a top view with illustrations of the same four tools;

DETAILED DESCRIPTION OF THE PREFERRED EMBODIMENTS OF THE INVENTION

Figure 1:
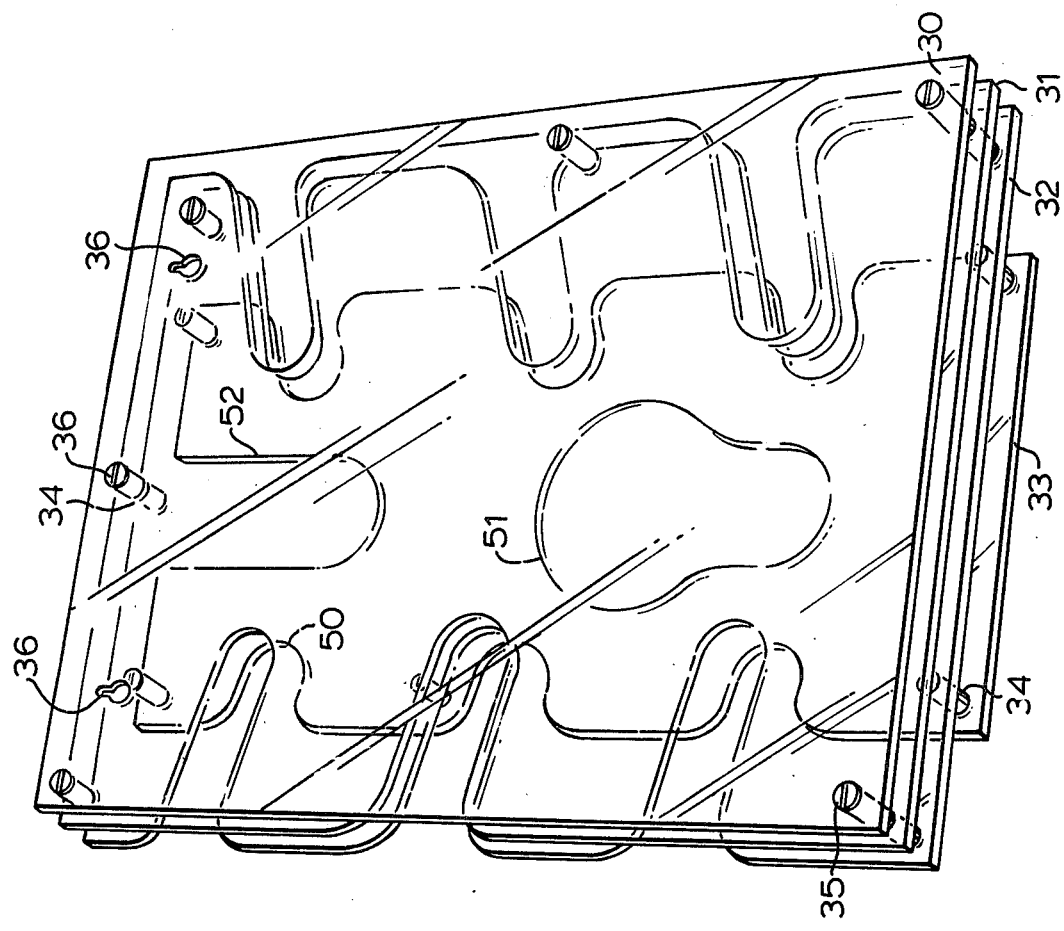
FIG. 1 is a front perspective view of a food processor tool holder.

Known tools for use with a household food processor are illustrated, in general outline only, in FIGS. 3, 4 and 5. Each tool has a cylindrical stem 10 by which it can be attached to the shaft of an electric motor (not shown). Extending radially from the stems are such active tool elements as a circular disc 11 having a slot 12 above a cutting blade 13; or a circular disc 14 having a slot 15 and a differently shaped cutting blade 16; or a circular disc 17 having apertures 18 at convex shredding cutters 19; or curved mixing blades 20. The holder in which these tools are located consists of four flat, transparent panels 30, 31, 32, 33, each panel preferably being a transparent acrylic plastic sheet. (Preferably the corners of the sheets are rounded, but this is not illustrated in the drawings.) The panels are spaced apart by cylindrical posts 34 that are internally threaded to receive bolts 35. The bolts pass through holes in the panels and screw into the posts 34 to secure the panels against the ends of the posts.

Figure 2:
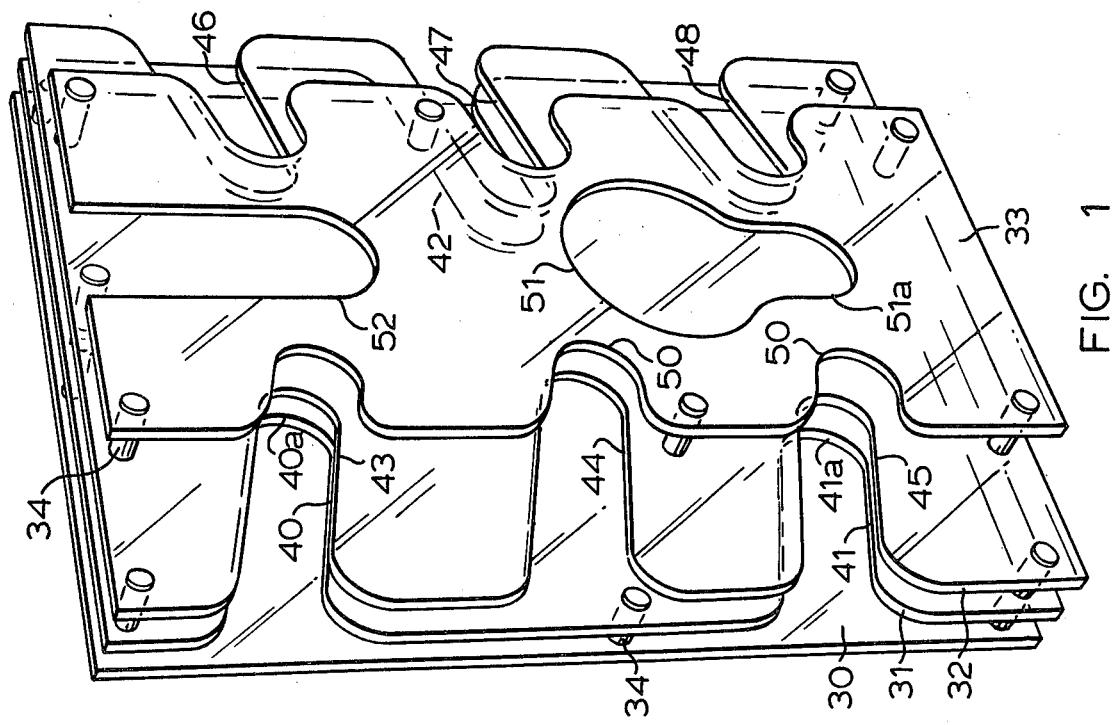
FIG. 2 is a rear perspective view thereof.

The holder can lie horizontally on the back panel 30, and can also stand on the bottom edges of the panels, but preferably it is hung from a wall or from the inside of a cupboard door, the panel 30 having keyhole-shaped openings 36 (FIG. 2) for reception of the head and stem of a supporting screw (not shown). At the left side edge of the intermediate panel 31 (when viewed from the front as in FIGS. 1 and 3), two slots 40 and 41 incline downwardly from the edge. The inner ends 40a, 41a of the slots are approximately the same shape, but are slightly larger than, the stems 10, to receive the stems or hubs thereon (not shown). The slots are so located and are sufficiently long that the active tool elements, such as 11, do not protrude beyond the edges of the panels when the tools are inserted into the slots. The intermediate panel 31 at its right side edge has a single slot 42, so located that a tool having its stem in slot 42 would not, with its active element, contact tools having their stems in slots 40 and 41, though the active elements would all be in the space between the panel 31 and the back panel 30.

The next intermediate panel 32 has a similar configuration to panel 31 except that it has three slots 43, 44, 45 in its left side edge and three slots 46, 47, 48 in its right side edge. The slots 43, 45 and 47 register with the slots 40, 41 and 42 respectively of panel 31, so that panel 32 does not interfere with insertion of tools into the slots of panel 31, with active elements of the tools located behind pane 31. The other slots 44, 46, 48 permit insertion of tools with their active elements between the panels 31 and 32, the slots again being so located that the active elements, such as 14, 17, are out of contact with one another and do not protrude beyond the edges of the panels.

The front panel 33 has slots 50 in registry with the slots of the other panels and capable of providing supplemental support for the stems of tools located in the holder. In its lower half the panel 33 has an irregularly shaped aperture or slot 51 which is sufficiently large that the active element, such as blades 20, 20a of a tool can be passed through the aperture for location in the space between the panels 32 and 33, the tool stem 10 protruding from the aperture 51 and nesting in a recess 51a at the bottom of the aperture, the bottom of the recess 51a being of substantially the same shape as, and slightly larger than, the stem. Extending downwardly from the top edge of the front panel 33 is a slot 52 for reception of the stem of a tool whose active element can be inserted in the space between panels 32 and 33, out of contact with the active element 20.

Figure 6:
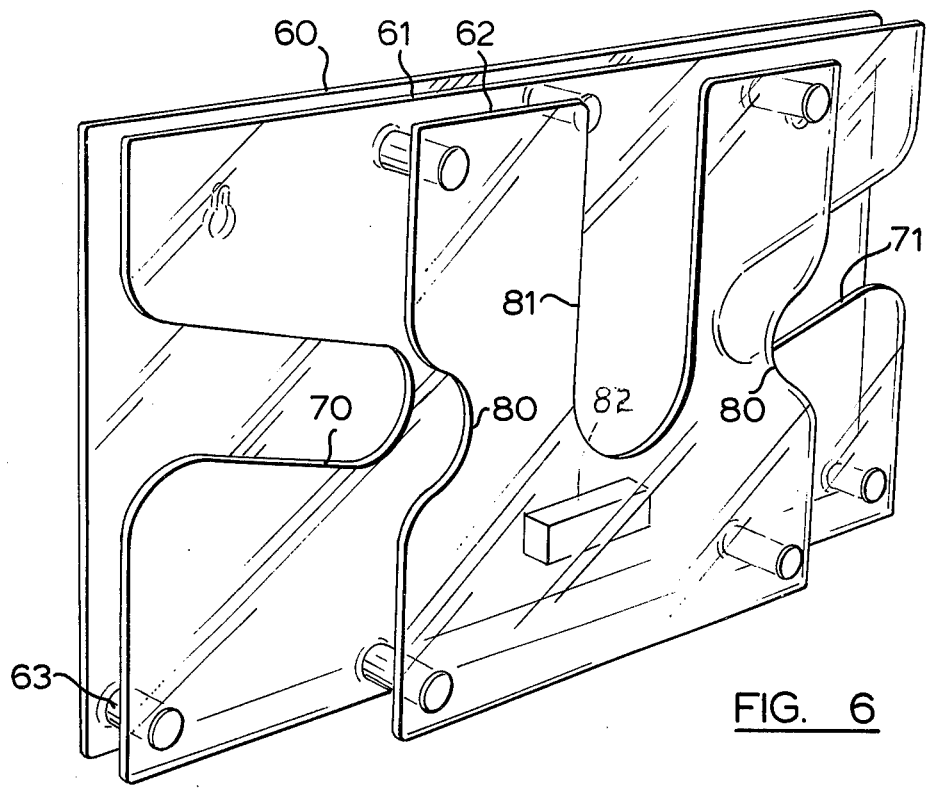
FIG. 6 is a front perspective view of a food processor tool holder for reception of fewer tools than the holder of FIGS. 1-5.
Figure 7:
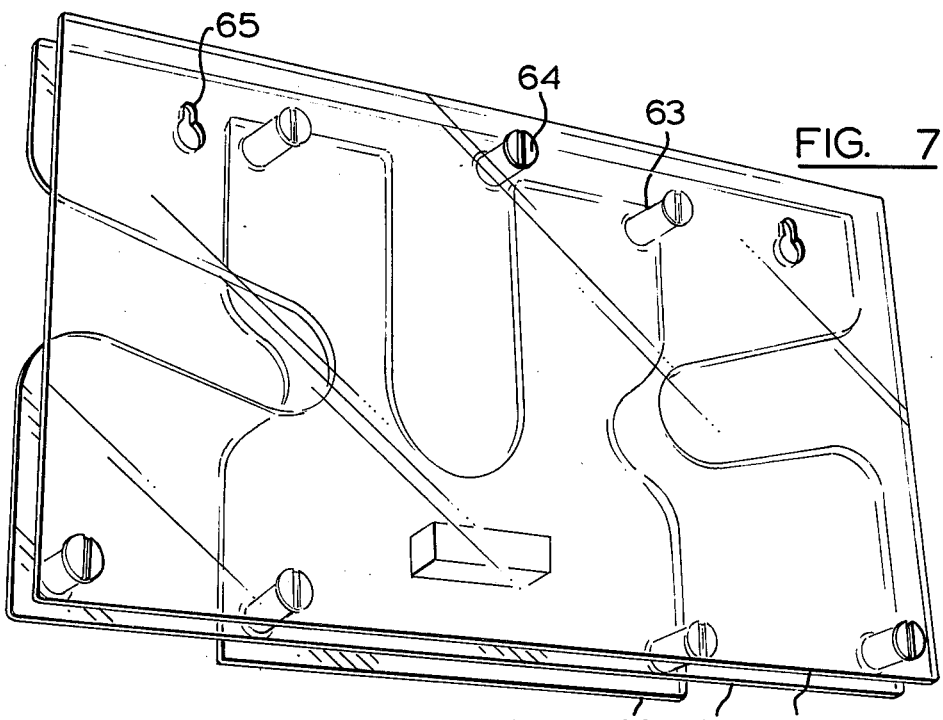
FIG. 7 is a rear perspective view of the holder of FIG. 7.
Figure 8:
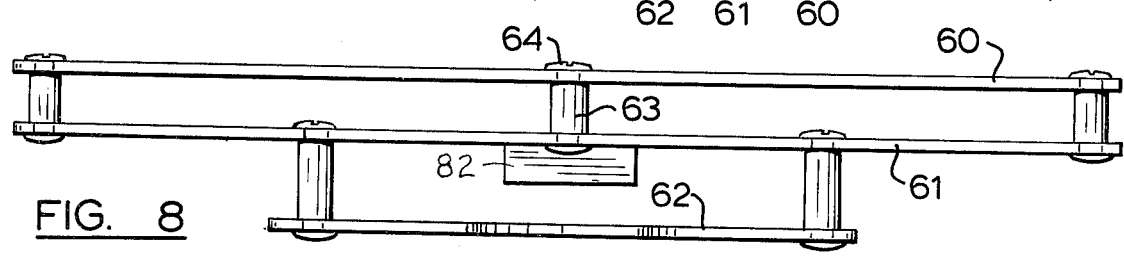
FIG. 8 is a top view of the holder of FIGS. 7 and 8.

In the embodiment illustrated in FIGS. 6, 7 and 8, the holder consists of three flat, transparent or translucent panels 60, 61, 62 spaced apart by spacers 63 which are secured to the panels by bolts 64. The holder can be suspended on a wall by use of keyhole shaped apertures 65 in the back panel 60. The intermediate panel 61 has two side slots 70, 71, and tools can be inserted into the holder by sliding their stems along these slots, with the active elements of the tools located in the space between panels 61 and 60, the panels and slots being so proportioned that the tools, with their stems resting at the ends of the downwardly inclined slots, are out of contact with each other and do not protrude beyond the edges of the panels. The front panel 62 has slots or recesses 80, in registry with the slots 70, 71 when viewed from the front, for support of the tool stems, and the panel has a further vertical slot 81 for reception of another tool with its active element in the space between the panels 62, 61.

The cylindrical spacers 34 (in the first embodiment) and 63 (in the second embodiment) are located where they do not interfere with the insertion and removal of the tools into and out of the holder in the manner herein described. The transparency of the panels facilitates visual selection of a desired tool in the holder. The tools can be compactly arranged within the holders with their active elements shielded. The spacing between the panels is sufficient to permit easy sliding of the active elements into the spaces, but the panels are sufficiently close together that the active elements of the tools cannot tilt very far without contacting the panels, so that the stems 10 protrude from the holder substantially horizontally.

Referring to FIG. 4, it will be noted that the blade 20 (which will be called a forward blade) is located forwardly in the space between the panels 32, 33, and with this arrangement there may be some danger of cutting a finger if the finger accidentally slips into the aperture 51. The same danger might exist if there were a forwardly located blade in the upper slot 52. It would be safer if the rear blade 20a were uppermost, and the forward blade 20 were the lower blade, because the forward blade 20 would then be behind the panel 33 (i.e. in the position that blade 20a is seen to occupy in FIG. 3). The user can be forced to position the blades in this safer position if an abutment, such as the abutment 82 (FIGS. 6-8), is provided on the panel 61 (FIGS. 6-8) or 32 (FIGS. 1-5) immediately behind the front panel 62 or 33. Such an abutment 82, adjacent and a little below the lower end of the slot 81 (or slot 52, or aperture 51) constitutes an obstruction which allows a tool having forward and rearward blades 20, 20a to be positioned only with the forward blade 20 directed downwardly, behind the front panel, the space between the abutment and the front panel being sufficient for only the forward blade 20a to pass downwardly.

Modifications within the scope of the following claims will readily occur to those skilled in the art.

What we claim as our invention is:

1. A holder for tools of the kind having active elements radial to stems thereof, the holder comprising a plurality of flat parallel panels including a rear panel and at least two transparent or translucent panels mounted forwardly thereof, means spacing the panels apart from one another thereby providing spaces between the panels to accommodate the active elements of the tools, said forwardly mounted panels having slots extending inwardly from the edges thereof, each said slot being adapted to receive the stem of a tool and provide therefor a path along which the stem can slide upon insertion or withdrawal of the tool, the slots being out of alignment with one another so that tools can be so inserted with each stem in a different slot whereby no tool so inserted is wholly in front of another.

2. A holder as claimed in claim 1, wherein the slots extend inwardly sufficiently that the active elements when inserted do not protrude beyond the edges of the panels whilst the stems protrude from the slots.

3. A holder as claimed in claim 2, wherein the panels are sufficiently close together that, with the panels vertical, they can sustain the active elements in substantially vertical planes between them, with the stems protruding from the slots.

4. A holder as claimed in claim 3, wherein the slots extend downwardly from the edges of the panels so that the tools must be lifted to remove them from the holder.

5. A holder as claimed in claim 4, at least one of said forwardly mounted panels having at least two stem-receiving slots, wherein the slots are so located that active elements accommodated in the same space are held out of contact with one another.

6. A holder as claimed in claim 4, wherein the forwardly mounted panels other than the panel adjacent the rear panel have additional slots aligned with the stem-receiving slots of panels behind them to accommodate the forwardly projecting stems of tools received by such stem-receiving slots.

7. A holder as claimed in claim 6, wherein the slots are arranged so that active elements of tools in one space overlap active elements of tools in another space but are kept out of contact by a panel between them.

8. A holder as claimed in claim 7, wherein the ends of the slots are shaped to match the stems so that the stems can nest in the slots.

9. A holder as claimed in claim 7, wherein the rear panel constitutes supporting means for the holder.

10. A holder as claimed in claim 9, wherein the panels are spaced apart by posts located where they do not interfere with the insertion and removal of tools.

11. A holder as claimed in claim 10, including a front panel having an aperture which does not extend to an edge of the front panel but is sufficiently large for a noncircular active element to be inserted therethrough, thereby to be located between panels with its stem protruding from the aperture.

12. A holder as claimed in claim 1, including an abutment on a panel rearward and downward of a slot in a front panel, the abutment being spaced from the front panel to allow only a forward portion of an active element to pass between the abutment and the front panel.

* * * * *